Patented May 2, 1944

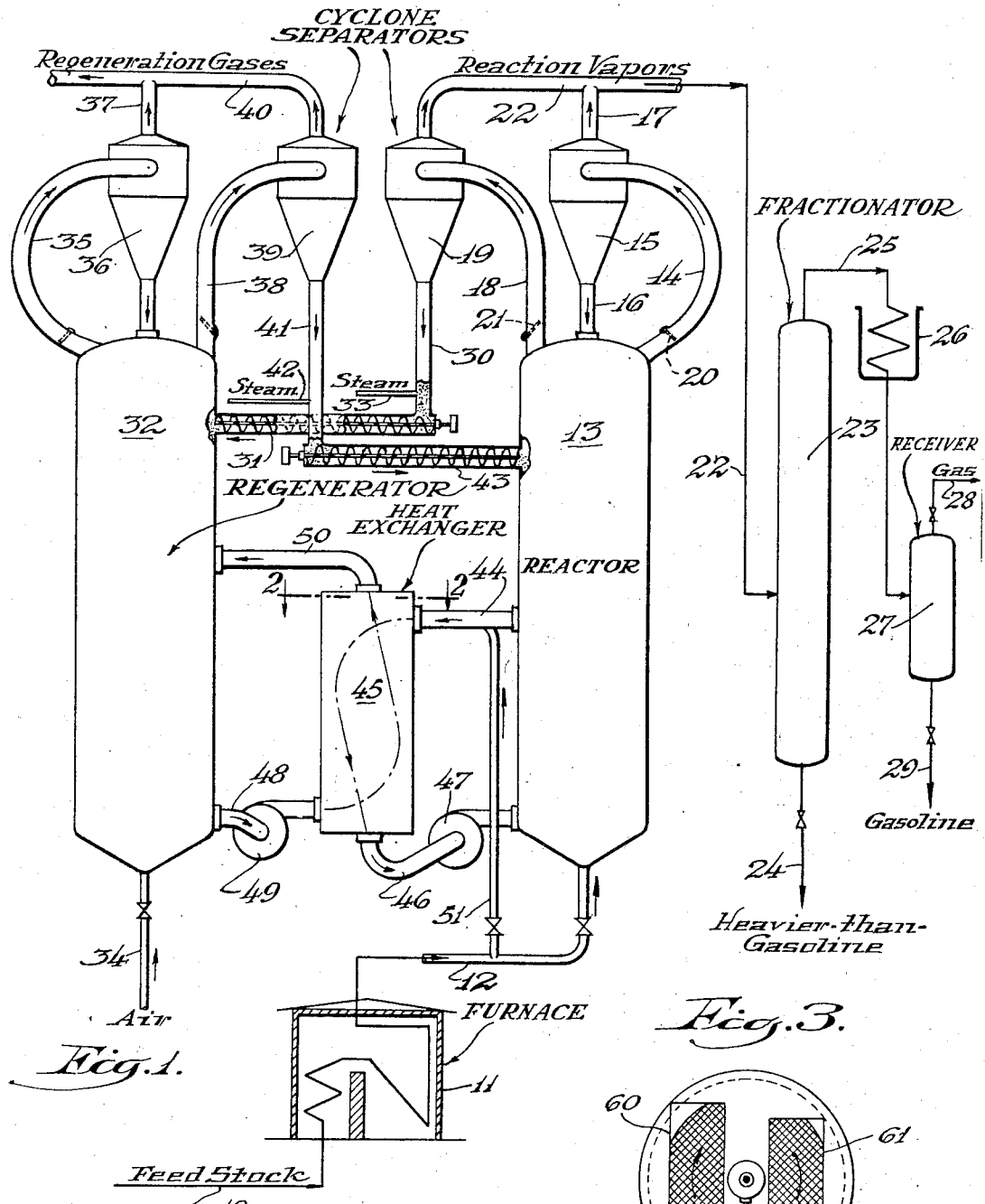
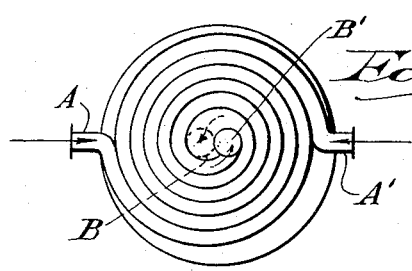
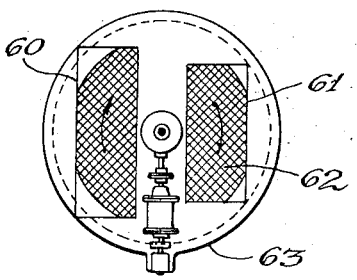

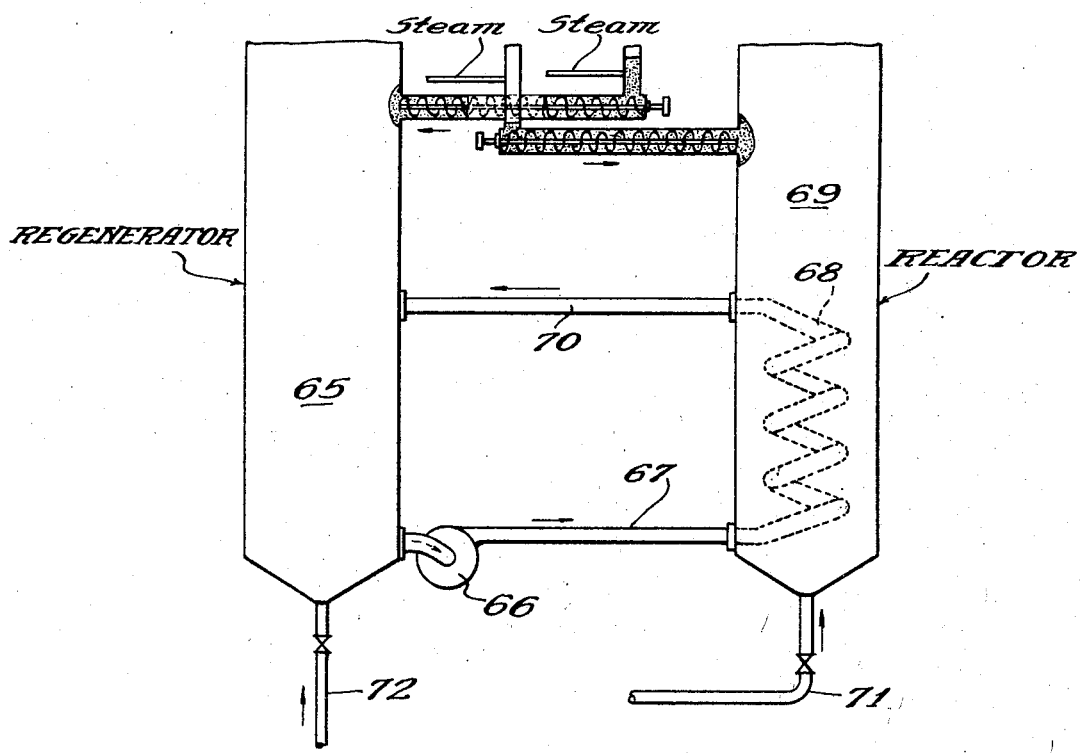

2,348,009

UNITED STATES PATENT OFFICE 2,348,009

CATALYTIC CONVERSION PROCESS

Everett A. Johnson, Park Ridge, and Vanderveer Voorhees, Homewood, Ill., assignors to Standard Oil Company, Chicago, Ill., a corporation of Indiana Application September 12, 1941, Serial No. 410,610

10 Claims. (Cl. 196—52)

This invention relates to the conversion of hydrocarbon oils and more particularly to the treatment of hydrocarbon vapors at high temperature with suspended, finely divided, solid catalysts. It also relates to a novel apparatus for carrying out this conversion. One object of the invention is to effect a more uniform temperature control in the reaction. Another object of the invention is to facilitate the regeneration of the catalyst by oxidation with air or other oxygen-containing gas. Yet another object of the invention is to regulate the velocity of vapors and turbulence within the reactor. Other objects of the invention will become apparent from the following description thereof.

The invention is illustrated by drawings which show diagrammatically in Figure 1 an apparatus for carrying out the process and in Figures 2 and 3 cross sectional views of heat exchangers which may be employed in the process. Figure 4 is a modification of the apparatus wherein the location of the heat exchange element is directly within one of the reaction zones employed in the process.

Referring to Figure 1 of the drawings, charging stock which may be gas oil, residual oil, heavy naptha or other desired feed stock is charged by line 10 to furnace 11 where it is preliminarily heated before charging by line 12 to reactor 13. In the case of vaporizable stocks such as gas oil and naptha, the feed may be completely vaporized. If desired it may also be heated to a high conversion temperature of the order of 900 to 975° F. or higher.

In reactor 13 the hydrocarbons are intimately mixed and contacted with a conversion catalyst which is maintained in suspension by the turbulent conditions existing within the reactor. Turbulence is supplied by the incoming blast of hydrocarbon vapor injected through line 12 and also by recycling the reaction mixture as will be hereinafter described.

It is desirable to maintain an upward velocity of vapor within reactor 13 sufficiently low to permit partial sedimentation of catalyst or "hindered settling" in the reactor, thereby increasing the concentration of the catalyst in the reactor and providing a greater surface of catalyst for contact with the hydrocarbons undergoing reaction. The catalyst density attained in this way may be of the order of 5 to 25 pounds per cubic foot, generally about 10 to 15 pounds per cubic foot, even though the catalyst is being charged at the rate of only ½ to 3 parts to one part of oil, by weight. By employing high catalyst density in this way, the volume of the reactor may be substantially reduced for a given time of contact between oil vapors and catalyst.

A portion of the reaction products is conducted from reactor 13 by transfer line 14 leading to knockback cyclone separator 15. In separator 15 the catalyst is removed from the vapors and allowed to flow back into the reactor through line 16 while the vapors are conducted away by line 17. Another portion of the products from reactor 13 is withdrawn by line 18 leading to catalyst separator 19. The relative amount of products entering the two separators is regulated by dampers 20 and 21.

Reaction products free from catalyst are withdrawn from separator 19 by line 22 and conducted to fractionator 23 where they are fractionated to remove products heavier than gasoline which are discharged by line 24. Gasoline vapors and gases are removed overhead by line 25 leading to condenser 26 and receiver 27 where the gases are discharged by line 28 and raw gasoline is withdrawn by line 29.

The catalyst separated in 19 is substantially spent and requires regeneration. It is conducted through column 30, thence by conveyor 31 leading to regenerator 32. A small stream of steam or inert gas is introduced at 33 and rises through column 30 serving the purpose of sweeping the catalyst free of hydrocarbon vapors and preventing their being carried into the regenerator.

In the regenerator the spent catalyst is contacted with oxygen suitably supplied as a stream of air by line 34. The concentration of oxygen may be reduced by admixing inert gases with the air; for example, flue gas or recycled regeneration gases may be employed. Cooling recycled gases or catalyst may be effected to assist in controlling regenerator temperature. The temperature in the regenerator should be maintained substantially above the lower limit of combustion for the carbonaceous materials deposited on the catalyst which is in the neighborhood of 900° F. In general, a temperature within the range of about 1000 to 1400° F. is satisfactory, depending on the nature of the catalyst being treated. Certain catalysts are less able to withstand high temperatures in regeneration and must be held at temperatures below about 1200° F. Other catalysts may be heated to 1500 or 1600° F. It is, therefore, important to control the temperature in the regenerator to avoid permanent injury to the catalyst and at the same time to insure substantially complete regeneration, i. e., removal of carbonaceous material from the catalyst by combustion.

A portion of the regenerated catalyst and regeneration gases is conducted by dampered line 35 to knockback cyclone separator 36 which returns separated catalyst to the regenerator, thereby assisting in maintaining the desired concentration of catalyst therein. Regeneration gases are exhausted by line 37. Another portion of the regeneration products is conducted by dampered line 38 to separator 39 where the regeneration gases are separated from the catalyst and discharged by line 40. The regenerated catalyst flows downward into column or standpipe 41 where it is swept with steam or other gas introduced at 42. Carrier 43 carries it back to reactor 13 and the cycle is repeated.

New catalyst may be added to the system at any convenient point not shown in order to make up loss of catalyst which may occur.

On account of the endothermic nature of the conversion reaction occuring in 13, it is necessary to supply heat in order to maintain the optimum reaction temperature. The temperature within reactor 13 is relatively uniform from top to bottom owing to the high turbulence of the gases and suspended catalyst therein. For cracking gas oil the desired temperature is generally within the range of 900 to 950° F. Lighter stocks, such as heavy napthas, require a higher temperature, of the order of 975 to 1050° F., especially where these are subjected to the action of a dehydrogenating catalyst in the presence of hydrogen to induce aromatization. Heavy oils, residuums, etc. may be processed at temperatures as low as 800° F. These may be introduced directly in the liquid state in the form of a spray. In the case of distillate oils, e. g., gas oils and naphthas, it has been the practice heretofore to superheat the vapors above the desired reaction temperature before introducing them into the reactor, thereby providing excess heat for the endothermic reaction. This practice has suffered from the disadvantage of incurring an undesirable amount of thermal cracking in the heating step. In the case of unvaporizable oils, this method of introducing heat is not applicable and some other means must be provided for maintaining the desired reaction temperature in the conversion operation.

In accordance with our invention, we provide necessary reaction heat by a novel method as follows: A portion of the reacting mixture, including catalyst and hydrocarbons, is withdrawn from reactor 13 by line 44, passes through indirect heat exchanger 45 and thence by line 46 and blower 47 back to reactor 15. Simultaneously, hot products from regenerator 32 are conducted by line 48 and blower 49 into heat exchange relation with the reaction products just mentioned in heat exchanger 45 and the regeneration products are returned to the regenerator at a lower temperature by line 50. Connections to the heat exchanger 45 are provided with large cross sectional areas and blowers 47 and 49 are preferably of the low speed type to reduce to a minimum vapor velocity and erosion from movement of the catalyst. The heat exchanger 45 is likewise provided with large passages to reduce the back pressure in the operation. If desired to increase gas velocity in the regenerator it may be done by withdrawing fluid catalyst suspended in regeneration products from a high point in the regenerator and returning to the regenerator at a low point.

A suitable design of heat exchanger for our purpose is illustrated in Figure 2 which shows a cross section of a cylindrical exchanger provided with spiral baffles which guide the gases through the exchanger. The baffles may be welded or riveted to the ends of the exchanger shell. The inlet ports are shown at A and A' and the outlet ports at B and B' when connected for countercurrent flow. Blowers 47 and 49 are provided with a variable speed drive thereby making it possible to regulate conveniently the amount of material passed through the heat exchanger and in this way control the temperature of the reactor and the regenerator.

Control of the regeneration temperature, i. e. by recycling cold regeneration gases, has already been mentioned. Another means of controlling the temperature of the system is by regulating the temperature at which the charging stock is fed into reactor 13. If desired, a portion of the charging stock may be charged directly to the heat exchanger by valved line 51 and vapor may be introduced into line 44 through a Venturi device thereby assisting circulation of the reaction mixture from reactor 13.

Figure 3 shows an end view of a rotary heat exchanger which may be employed for heat exchanger 45. The Ljungstrom heat exchanger is an example of this type. Looking through the open ports 60 and 61 we seen the end of the cellular cylinder 62. One stream of gases enters port 60 and discharges through a similar port at the opposite end of the regenerator. The other stream of hot gases enters at the opposite end and discharges from port 61. Heat is transferred to the cellular metal cylinder 62 which slowly revolves conducting the heat from one side to the other past a division plate, not shown, within the casing 63 which separates the two streams of gases.

The apparatus shown in Figure 4 is, in general, the same as that shown in Figure 1 and therefore only a part of the apparatus of Figure 1 is repeated. In this modification, heat transfer between the dense catalyst phase in the regenerator and the reactor is effected by a heat exchange coil placed directly within the reactor or the regenerator. As shown in the drawings the heat exchange element is directly within the reactor. Referring to the drawings, the dense phase fluidized catalyst in regenerator 65 is withdrawn by blower 66 and line 67 through coil 68 in reactor 69 whence it returns by line 70 to regenerator 65. The hydrocarbon charging stock enters reactor 69 by feed line 71 and serves to maintain a high turbulence within the fluidized solid catalyst in suspension in the reactor. The turbulent flow serves to bring the catalyst and hydrocarbons undergoing reaction in 69 in intimate contact with heating coil 68, the surface of which is maintained at a substantially higher temperature by the stream of hot regeneration products and catalyst flowing therethrough. As a result of the turbulent flow of catalyst in reactor 69 the heat transfer rate is very satisfactory. Reaction products leave the top of reactor 69 in a manner similar to that shown in Figure 1. Air for regeneration in regenerator 65 is supplied by line 72 and the regeneration products are withdrawn from the top of the regenerator as indicated in Figure 1.

The operation of our process does not depend upon using any particular catalyst. Catalysts employed for hydrocarbon conversion are generally of the metal oxide type. Silica and alumina in various mixtures and as occurring naturally in bentonite and other clays, preferably after treatment with acids, are suitable catalysts for the conversion of heavy oils into gasoline. By the use of acid treated bentonite, for example, gas oil may be converted into gasoline having a knock rating of 80 A. S. T. M. or above. By the use of synthetic catalysts, e. g., combinations of silica gel with alumina or magnesia, gasoline having a knock rating as high as 85 or better can be produced. Aluminum oxide promoted with metal oxides of the Vth and VIth groups, for example, vanadium, chromium or molybdenum oxide, are effective catalysts for naptha reforming, particularly in the presence of hydrogen. For most operations it is desirable to use catalyst in the form of particles which will pass screens of 50 to 200 mesh, although finer catalysts of the order of 300 to 400 mesh may be employed. In some cases we may use catalysts as coarse as 1/4 inch mesh. However, erosion is increased in proportion to the coarseness of the catalyst particles or granules.

The amount of catalyst suspension circulated in heat exchange between the reactor and regenerator will vary with the type of operation, reaction conditions, etc., but in general it will be about 1/2 to 10 volumes per volume of hydrocarbon vapor treated. If desired, one stream only may be recycled through coils located in the other suspension. Thus, the reactor suspension may be passed through coils in the regenerator and returned to the reactor, in which case it is only necessary to control the amount of a single stream for temperature control. Conversely, the regenerator suspension may be led through coils in the reactor in a similar manner. If desired, the heat exchange coils employed in this way may be designed to offer a sufficiently low resistance to the flow of suspension therein so that the regenerator suspension will flow by gravity from an elevated point in the regenerator through the coils within the reactor and back to a low point in the regenerator. This operation applies particularly to handling the catalyst in suspension in the dense phase where the gravitation effect is relatively high.

Although we have described our invention with respect to certain embodiments thereof, we intend that it be defined only by the following claims.

We claim:

1. The process of converting hydrocarbons which comprises continuously subjecting them at conversion temperature to the action of a solid conversion catalyst in dense phase fluid suspension under conditions of hindered settling in an upflowing vertically elongated reaction zone where heat is absorbed, separating spent catalyst from the reaction products, regenerating said spent catalyst by suspending it in an oxidizing gas in an upflowing vertically elongated regeneration zone at a higher temperature than said conversion temperature wherein heat is evolved, recovering regenerated catalyst and returning it to said reaction zone and transferring excess heat from said regeneration zone to said reaction zone by continuously withdrawing a controlled amount of fluid catalyst suspension from one of said zones, passing said withdrawn catalyst suspension in indirect heat exchange relation with fluid catalyst suspension from the other of said zones and thence passing it back to the zone from which it was withdrawn.

2. In a catalytic conversion process where hydrocarbons are converted in the vapor phase with absorption of heat by contacting at conversion temperature in an upflowing vertically elongated reaction zone with a finely divided, solid catalyst in dense phase fluid suspension under conditions of hindered settling, the catalyst is separated from the reaction products, gasoline is recovered from the products, the catalyst is regenerated in fluid suspension, at a higher temperature than said conversion temperature, by combustion with air in an upflowing vertically elongated regeneration zone with the evolution of heat and the regenerated catalyst is returned to the reaction zone for further hydrocarbon conversion, the method of controlling the temperature of both reaction zone and regeneration zone, which comprises continuously circulating a portion of the reaction mixture from said reaction zone into indirect heat exchange relation with the hot products in said regeneration zone and thence back to said reaction zone at a higher temperature, and controlling the temperature of said reaction zone by controlling the rate of circulation of said reaction mixture.

3. The process of claim 2 wherein part of the hydrocarbons charged to the said reaction zone is introduced into the stream of circulating reaction mixture before entering into heat exchange relation with said regeneration products.

4. The process of claim 2 wherein the circulation of said reaction mixture is assisted by aspirating with vapors of hydrocarbons charged to the system.

5. An apparatus for converting hydrocarbon oils which comprises a reactor, a regenerator, and a heat exchanger, means for charging hydrocarbon feed stocks to said reactor, means for charging finely divided, solid catalyst to said reactor, means for maintaining catalyst in fluid suspension in said reactor, means for withdrawing reaction products and catalyst from said reactor and conveying said catalyst to said regenerator, means for introducing an oxidizing gas into said regenerator, means for maintaining catalyst in fluid suspension in said gas within said regenerator, means for removing regenerated catalyst from said regenerator and returning it to said reactor, means for circulating hot fluid catalyst suspended in products from said regenerator to said heat exchanger and back to said regenerator, and means for recycling cooler fluid catalyst suspended in products from said reactor to said heat exchanger and back to said reactor.

6. In the process of converting hydrocarbon oils by contacting their vapors at conversion temperature with a solid, finely divided hydrocarbon conversion catalyst in fluid suspension in a vertically elongated reaction zone, separating the catalyst from the vapors, regenerating the catalyst by contacting with an oxygen-containing gas in fluid suspension in a vertically elongated regeneration zone and recycling the regenerated catalyst to the reaction zone, said process being characterized by an endothermic reaction in the reaction zone and an exothermic reaction at a higher temperature in the regeneration zone, the improvement comprising passing hydrocarbon vapors upwardly through said reaction zone and passing regeneration gases upwardly through said regeneration zone, maintaining the catalyst in said reaction and regeneration zones in a turbulent dense phase containing about 5 to 25 pounds of catalyst per cubic foot, withdrawing a portion of said dense catalyst phase from one of said zones, indirectly exchanging heat between said withdrawn catalyst and catalyst in the other zone and then returning said withdrawn catalyst to the zone from which it was withdrawn, thereby effecting a transfer of heat from said regeneration zone to said reaction zone.

7. In the process of converting hydrocarbon oils wherein the vapors of said oils are contacted at conversion temperature with a finely divided solid conversion catalyst in dense phase, fluid suspension in an enlarged vertically elongated upflowing reaction zone, under conditions of hindered settling, the catalyst is separated from the reaction products and regenerated by suspending in an oxidizing gas in an enlarged vertically elongated upflowing regeneration zone after which it is recovered and recycled to said reaction zone, the improvement comprising controlling the temperature of said reaction and regeneration zones by circulating hot fluid catalyst suspended in regeneration products from said regeneration zone and cooler fluid catalyst suspended in reaction products from said reaction zone into indirect heat exchange relation with each other and back to the respective zones from which they were withdrawn and regulating amounts circulated to control the temperature in said zones.

8. The process of claim 6 wherein the volume of catalyst withdrawn for heat exchange between said regeneration and reaction zones is one-half to ten times the volume of the vapors of the said hydrocarbon oils treated.

9. The process of converting hydrocarbons which comprises continuously subjecting them at conversion temperature to the action of a solid conversion catalyst in dense phase fluid suspension under conditions of hindered settling in an upflowing vertically elongated reaction zone where heat is absorbed, separating spent catalyst from the reaction products, regenerating said spent catalyst by suspending it in an oxidizing gas in an upflowing vertically elongated regeneration zone at a higher temperature than said conversion temperature wherein heat is evolved, recovering regenerated catalyst and returning it to said reaction zone and transferring excess heat from said regeneration zone to said reaction zone by continuously withdrawing a controlled amount of fluid catalyst suspension from an intermediate point in said reaction zone, passing said withdrawn catalyst suspension in indirect heat exchange relation with fluid catalyst suspension from said regeneration zone and thence recycling it to a low point in said reaction zone, thereby increasing the vapor velocity and turbulence within said reaction zone.

10. The process of converting hydrocarbons which comprises continuously subjecting them at conversion temperature to the action of a solid conversion catalyst in dense phase fluid suspension under conditions of hindered settling in an upflowing vertically elongated reaction zone where heat is absorbed, separating spent catalyst from the reaction products, regenerating said spent catalyst by suspending it in an oxidizing gas in an upflowing vertically elongated regeneration zone at a higher temperature than said conversion temperature wherein heat is evolved, recovering regenerated catalyst and returning it to said reaction zone and transferring excess heat from said regeneration zone to said reaction zone by continuously withdrawing a controlled amount of fluid catalyst suspension from an intermediate point in said regeneration zone, passing said withdrawn catalyst suspension in indirect heat exchange relation with fluid catalyst suspension from said reaction zone and thence recycling it to a low point in said regeneration zone, thereby increasing the vapor velocity and turbulence within said regeneration zone.

EVERETT A. JOHNSON.
VANDERVEER VOORHEES.